US011278837B2

(12) United States Patent
Tahara et al.

(10) Patent No.: US 11,278,837 B2
(45) Date of Patent: Mar. 22, 2022

(54) BACKPACK DUST COLLECTOR

(71) Applicant: MAKITA CORPORATION, Anjo (JP)

(72) Inventors: Takayuki Tahara, Anjo (JP); Makoto Hotta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 156 days.

(21) Appl. No.: 16/806,133

(22) Filed: Mar. 2, 2020

(65) Prior Publication Data

US 2020/0282354 A1    Sep. 10, 2020

(30) Foreign Application Priority Data

Mar. 5, 2019    (JP) .............................. JP2019-039486

(51) Int. Cl.
| | | |
|---|---|---|
| *B01D 46/42* | (2006.01) | |
| *B01D 46/02* | (2006.01) | |
| *H01M 50/20* | (2021.01) | |
| *A47L 5/36* | (2006.01) | |
| *A47L 9/28* | (2006.01) | |

(52) U.S. Cl.
CPC ............ *B01D 46/4245* (2013.01); *A47L 5/36* (2013.01); *A47L 9/2868* (2013.01); *B01D 46/02* (2013.01); *H01M 50/20* (2021.01); *B01D 2279/40* (2013.01); *H01M 2220/30* (2013.01)

(58) Field of Classification Search
CPC .............. B01D 46/4245; B01D 46/02; B01D 2279/40; H01M 2220/30; H01M 50/20; A47L 9/28; A47L 9/2868
See application file for complete search history.

(56) References Cited

U.S. PATENT DOCUMENTS

| | | | | |
|---|---|---|---|---|
| 2008/0124615 | A1* | 5/2008 | Matsumoto | ........... H01M 50/20 429/61 |
| 2009/0255084 | A1 | 10/2009 | Gee, II et al. | |
| 2016/0293912 | A1* | 10/2016 | Manion | ................ A47L 9/2884 |

(Continued)

FOREIGN PATENT DOCUMENTS

| | | |
|---|---|---|
| DE | 10 2016 112 420 A1 | 1/2017 |
| DE | 10 2016 111 876 A1 | 1/2018 |

(Continued)

OTHER PUBLICATIONS

Jan. 4, 2021 Office Action issued in German Patent Application No. 10 2020 105 660.5.

*Primary Examiner* — Robert Clemente
(74) *Attorney, Agent, or Firm* — Oliff PLC

(57) ABSTRACT

A backpack dust collector includes a housing. The housing includes: a suction port; a dust collecting chamber connected to the suction port and configured to accommodate a dust collecting bag; a motor chamber connected to the dust collecting chamber and accommodating a fan and a motor; an exhaust port through which air from the motor chamber is discharged; first and second battery openings; and first and second battery receiving portions respectively corresponding to the first and second battery openings. At least part of the first battery opening is formed on a left side surface of the housing, and at least part of the second battery opening is formed on a right side surface of the housing.

20 Claims, 16 Drawing Sheets

(56) References Cited

U.S. PATENT DOCUMENTS

2017/0007085 A1 1/2017 Tahara
2017/0035261 A1 2/2017 Lauer

FOREIGN PATENT DOCUMENTS

| DE | 11 2017 001 611 T5 | 12/2018 |
|----|---------------------|---------|
| EP | 3 272 261 A2 | 1/2018 |
| EP | 3 437 534 A1 | 2/2019 |
| JP | 2017-018567 A | 1/2017 |
| JP | 2019-000477 A | 1/2019 |

* cited by examiner

BACKPACK DUST COLLECTOR

CROSS-REFERENCE TO RELATED APPLICATION(S)

The present application claims priority to and incorporates by reference the entire contents of Japanese Patent Application No. 2019-039486 filed in Japan on Mar. 5, 2019.

BACKGROUND OF THE INVENTION

1. Field of the Invention

The present invention relates to a backpack dust collector.

2. Description of the Related Art

A backpack dust collector includes a fan and a motor configured to generate motive power for rotating the fan. By rotating the fan, air is suctioned with dust through a suction port of the backpack dust collector. The air suctioned through the suction port flows through an internal space of the backpack dust collector, and is then discharged through an exhaust port. An example of related art is described in JP-A-2017-018567.

In the case where the backpack dust collector includes a battery mounting portion to which a battery is mounted, it is desired that the battery can be mounted and removed smoothly.

An object of an aspect of the present invention is to enable a battery to be mounted and removed smoothly.

SUMMARY OF THE INVENTION

A backpack dust collector includes a housing. The housing includes: a suction port; a dust collecting chamber connected to the suction port and configured to accommodate a dust collecting bag; a motor chamber connected to the dust collecting chamber and accommodating a fan and a motor; an exhaust port through which air from the motor chamber is discharged; first and second battery openings; and first and second battery receiving portions respectively corresponding to the first and second battery openings. At least part of the first battery opening is formed on a left side surface of the housing, and at least part of the second battery opening is formed on a right side surface of the housing.

DETAILED DESCRIPTION OF THE PREFERRED EMBODIMENTS

Embodiments of the present invention will now be described with reference to the drawings. However, the present invention is not limited to these embodiments. Components according to the respective embodiments may be combined appropriately. Some components may be omitted.

In the following description, the terms "left", "right", "front", "rear", "up", and "down" are used to describe positional relations of the respective components. These terms indicate relative positions or directions with respect to an operator WM.

First Embodiment

Figure 1:
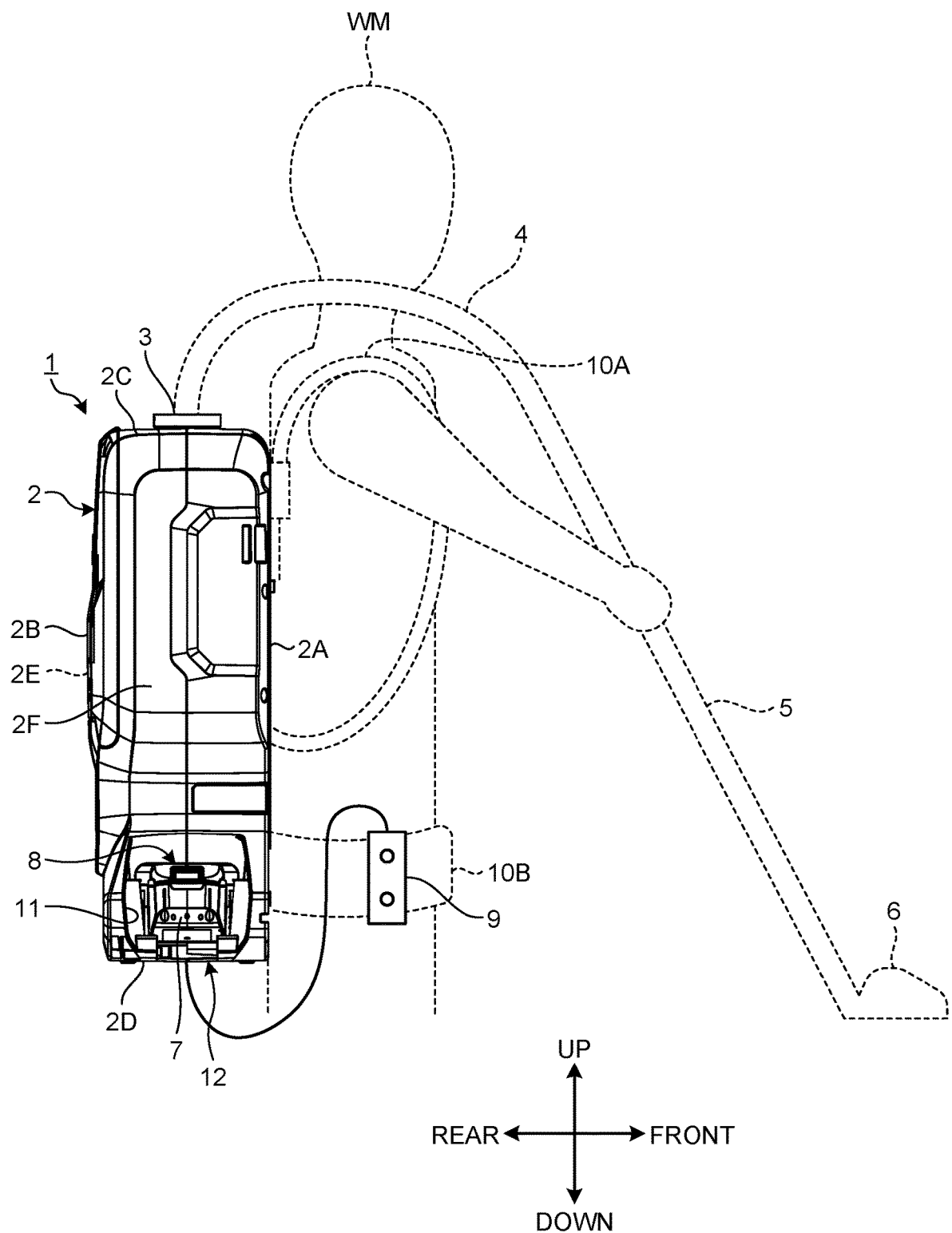
FIG. 1 is a side view of a backpack dust collector according to a first embodiment.

FIG. 1 is a side view of a backpack dust collector 1 according to the present embodiment. As illustrated in FIG. 1, the backpack dust collector 1 is used while being carried on an operator WM□s back. The backpack dust collector 1 includes a housing 2, a hose 4 connected to a suction port 3 of the housing 2, a pipe 5 connected to the hose 4, a nozzle 6 connected to the pipe 5, battery mounting portions 8 to each of which a general-purpose battery 7 is mounted, and an operation unit 9.

The general-purpose battery 7 can be used as a power supply for electrical machinery and apparatus of various types. The general-purpose battery 7 can be used as a power supply for a power tool. The general-purpose battery 7 can be used also as a power supply for electric machinery and apparatus other than the power tool. The general-purpose battery 7 can be used also as a power supply for a dust collector other than the backpack dust collector 1 according to the present embodiment. In the following description, the general-purpose battery 7 is called "battery 7" as appropriate.

The housing 2 is carried on the operator WM□s back. The housing 2 is attached to the operator WM□s back with shoulder belts 10A and a waist belt 10B. The shoulder belts 10A are attached to the operator WM□s shoulders. The waist belt 10B is attached to the operator WM□s waist.

The housing 2 has an internal space. The housing 2 has a front surface 2A facing forward, a rear surface 2B facing rearward, an upper surface 2C facing upward, a lower surface 2D facing downward, a left side surface 2E facing leftward, and a right side surface 2F facing rightward. In a state in which the housing 2 is carried on the operator WM□s back, the front surface 2A of the housing 2 faces the operator WM□s back.

The suction port 3 is disposed in an upper portion of the housing 2. The hose 4 is flexible. One end portion of the hose 4 is connected to the suction port 3. The other end portion of the hose 4 is connected to one end portion of the pipe 5. The nozzle 6 is connected to the other end portion of the pipe 5. The nozzle 6 has a suction opening.

The housing 2 includes battery openings 11 through which the corresponding batteries 7 can pass and battery receiving portions 12 respectively connected to the battery openings 11. Each battery 7 is received by the corresponding battery receiving portion 12. Each battery opening 11 is formed at a lower portion of the housing 2. Each battery mounting portion 8 is arranged in the corresponding battery receiving portion 12.

The operation unit 9 is operated by the operator WM. The operation unit 9 includes a switch for starting up the backpack dust collector 1. The operation unit 9 is attachable to the waist belt 10B.

Figure 2:
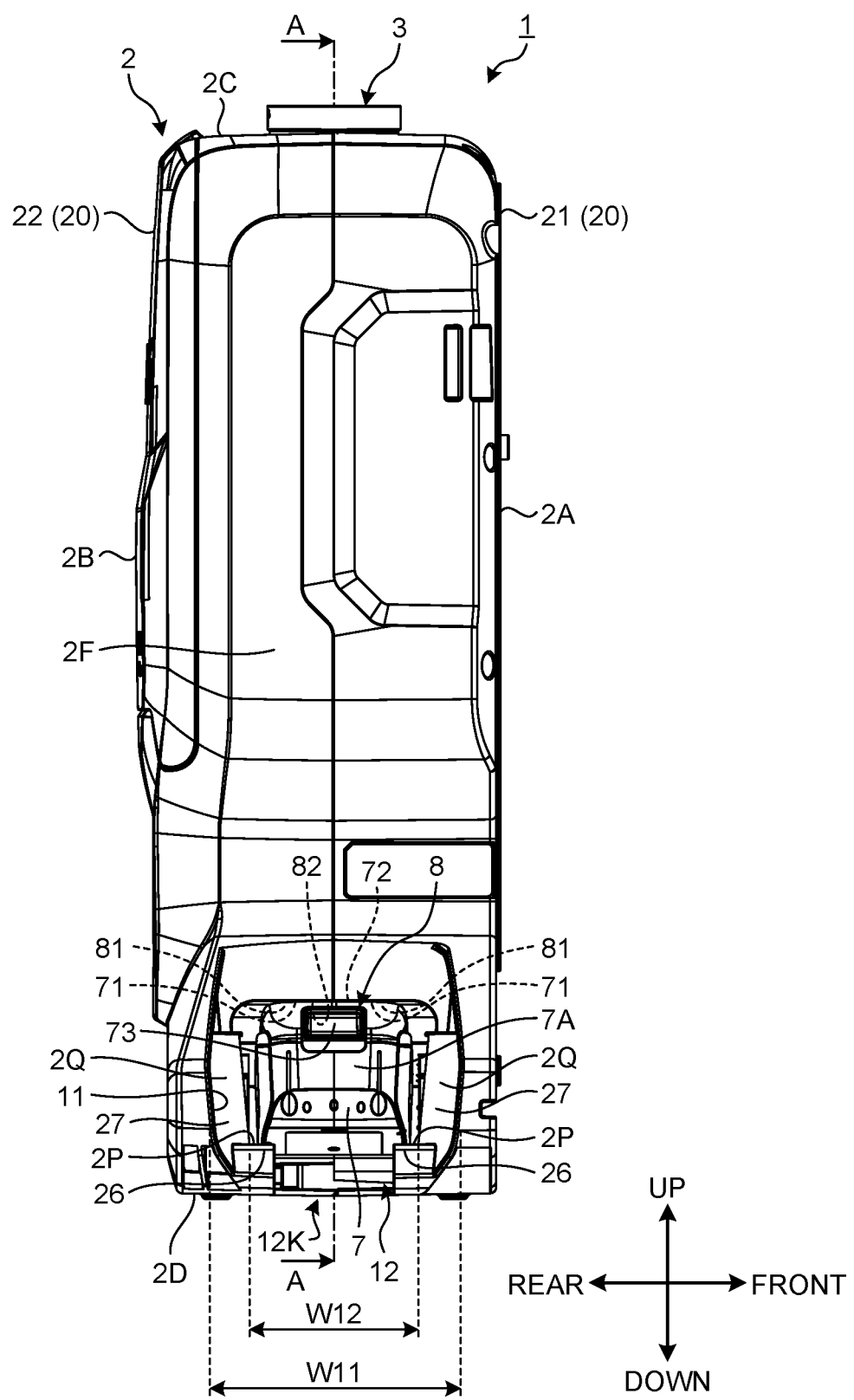
FIG. 2 is a side view of the backpack dust collector according to the first embodiment.
Figure 3:
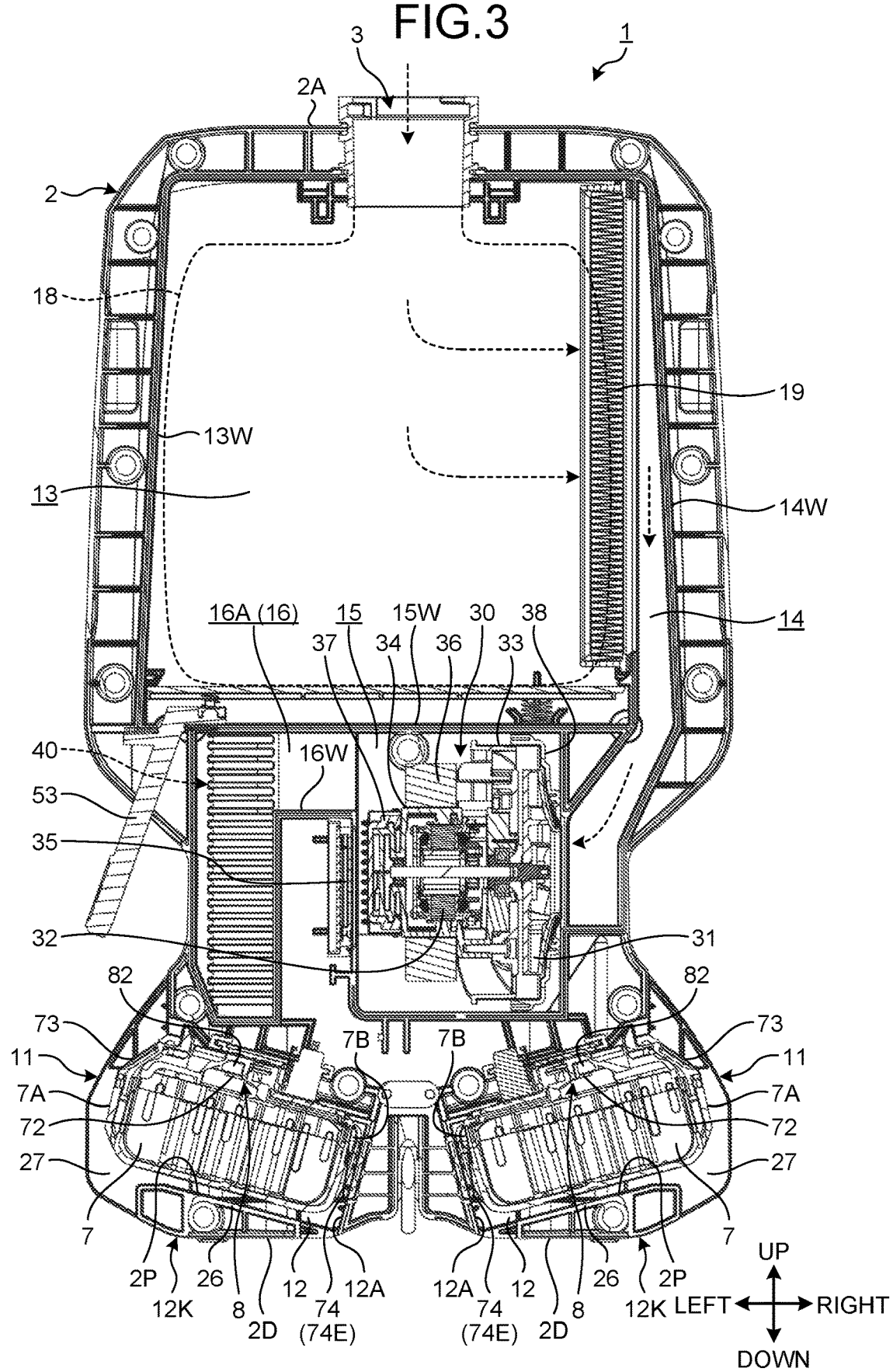
FIG. 3 is a sectional view of the backpack dust collector according to the first embodiment.
Figure 4:
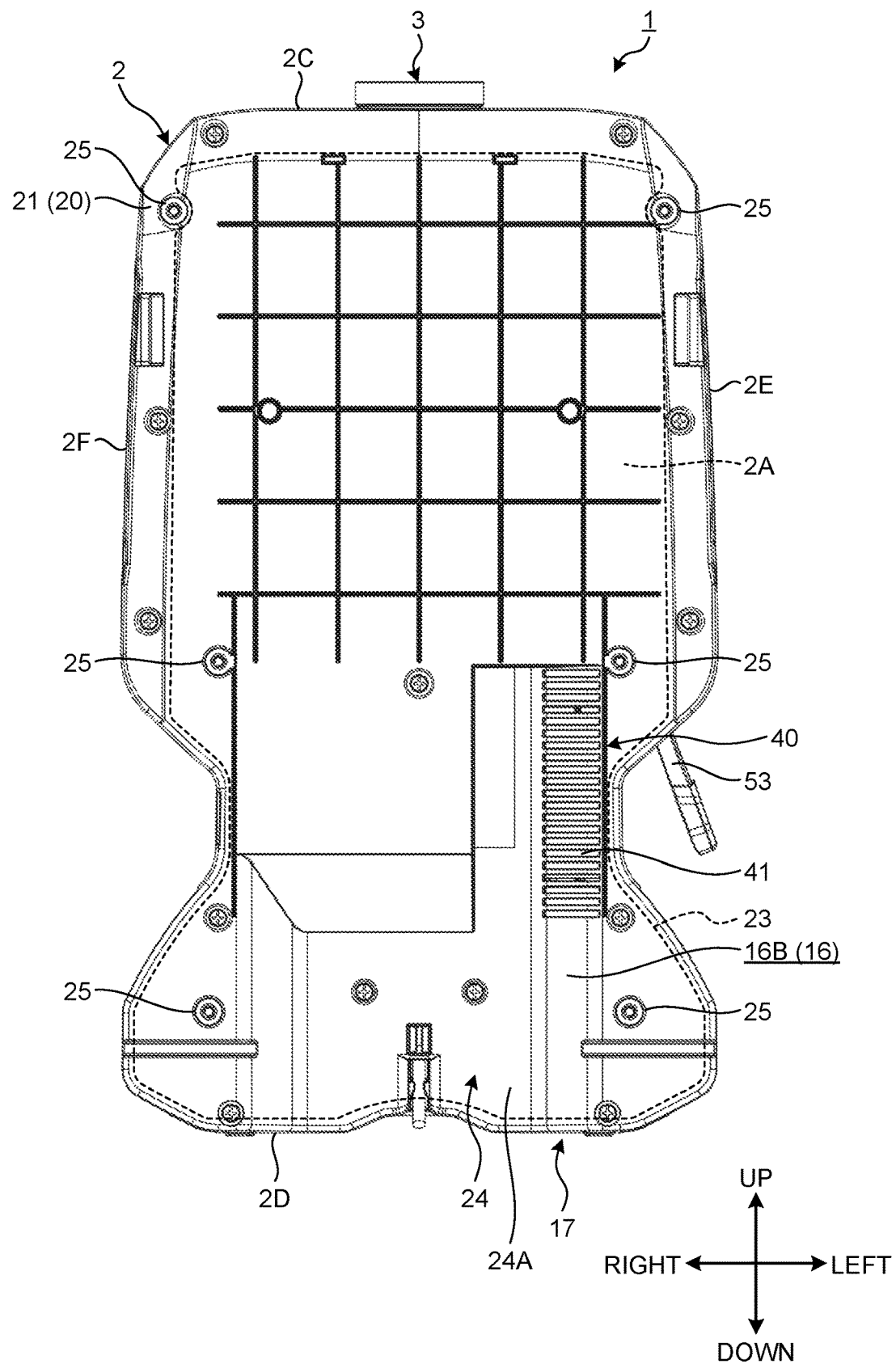
FIG. 4 is a front view of the backpack dust collector according to the first embodiment.
Figure 5:
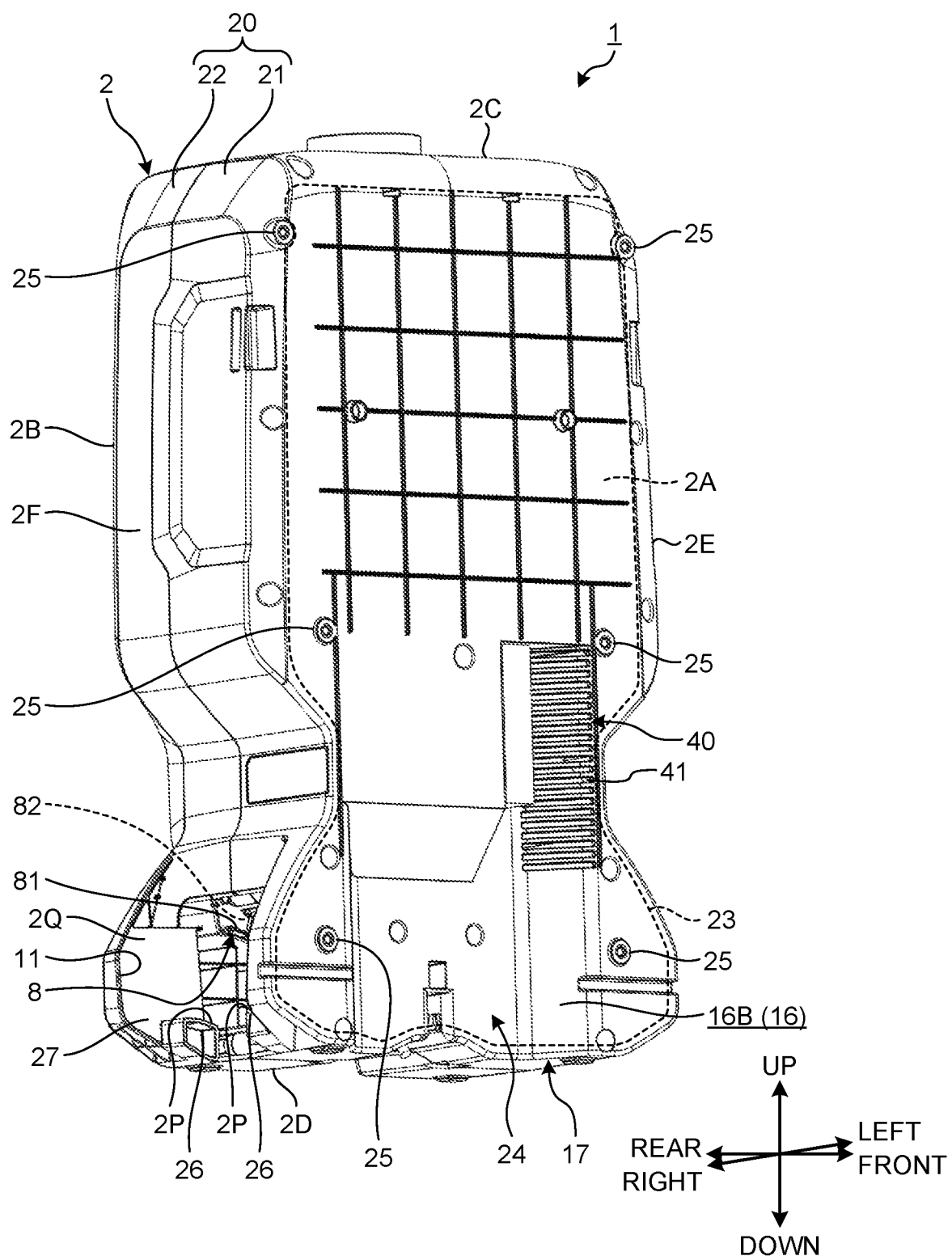
FIG. 5 is a perspective view of the backpack dust collector according to the first embodiment.

FIG. 2 is a side view of the backpack dust collector 1 according to the present embodiment. FIG. 3 is a sectional view of the backpack dust collector 1 according to the present embodiment taken along line A-A in FIG. 2. FIG. 4 is a front view of the backpack dust collector 1 according to the present embodiment. FIG. 5 is a perspective view of the backpack dust collector 1 according to the present embodiment.

The housing 2 includes a base housing 20 having an internal space and a plate 23 connected to the base housing 20. The base housing 20 includes a front housing 21 and a rear housing 22. The front housing 21 and the rear housing 22 are connected to each other. The plate 23 is connected to the front housing 21. The plate 23 is fixed to the front housing 21 with a plurality of threaded bosses 25. In FIG. 4 and FIG. 5, the plate 23 is indicated by an imaginary line.

The front housing 21 includes part of the upper surface 2C, part of the lower surface 2D, part of the left side surface 2E, and part of the right side surface 2F. The rear housing 22 includes the rear surface 2B, part of the upper surface 2C, part of the lower surface 2D, part of the left side surface 2E, and part of the right side surface 2F. A rear end portion of the front housing 21 and a front end portion of the rear housing 22 are connected to each other, whereby the internal space of the base housing 20 is defined.

The front housing 21 has a recessed portion 24 formed therein. The recessed portion 24 is recessed rearward in a lower portion of the front housing 21. The plate 23 is disposed so as to cover the opening of the recessed portion 24. The plate 23 includes the front surface 2A. In a state in which the housing 2 is carried on the operator WM□s back, the plate 23 faces the operator WM□s back.

The housing 2 includes the suction port 3, a dust collecting chamber 13 connected to the suction port 3, a motor chamber 15 connected to the dust collecting chamber 13 with a flow path 14 interposed therebetween, and an exhaust port 17 connected to the motor chamber 15 with a flow path 16 interposed therebetween.

The dust collecting chamber 13, the flow path 14, the motor chamber 15, and part of flow path 16 are defined in the internal space of the base housing 20. Part of the flow path 16 is defined between the recessed portion 24 of the front housing 21 and the plate 23.

The dust collecting chamber 13 is disposed in an upper portion of the internal space of the base housing 20. The dust collecting chamber 13 is defined by a partition wall 13W arranged in at least part of the perimeter of the dust collecting chamber 13. The dust collecting chamber 13 accommodates a dust collecting bag 18. The dust collecting bag 18 is connected to the suction port 3. The dust collecting bag 18 is a paper bag, for example. The dust collecting bag 18 is configured to catch and collect dust.

The motor chamber 15 is disposed below the dust collecting chamber 13 in the internal space of the base housing 20. The motor chamber 15 is defined by a partition wall 15W arranged in at least part of the perimeter of the motor chamber 15. The motor chamber 15 accommodates a drive unit 30 including a fan 31 and a motor 32.

The flow path 14 is disposed in a right portion of the internal space of the base housing 20. The flow path 14 is defined by a partition wall 14W arranged in at least part of the perimeter of the flow path 14. The flow path 14 extends in an up-and-down direction. The flow path 14 connects a right portion of the dust collecting chamber 13 and a right portion of the motor chamber 15.

In a boundary between the dust collecting chamber 13 and the flow path 14, a filter 19 is disposed. The filter 19 is a high-efficiency particulate air filter (HEPA), for example. The filter 19 is disposed on a side of the dust collecting chamber 13. In the present embodiment, the filter 19 is disposed on the right side of the dust collecting chamber 13. The filter 19 extends in the up-and-down direction. The filter 19 is disposed so as to face the dust collecting chamber 13.

The flow path 16 connects the motor chamber 15 and the exhaust port 17. Air from the motor chamber 15 is discharged to a space outside the housing 2 through the exhaust port 17.

Figure 6:
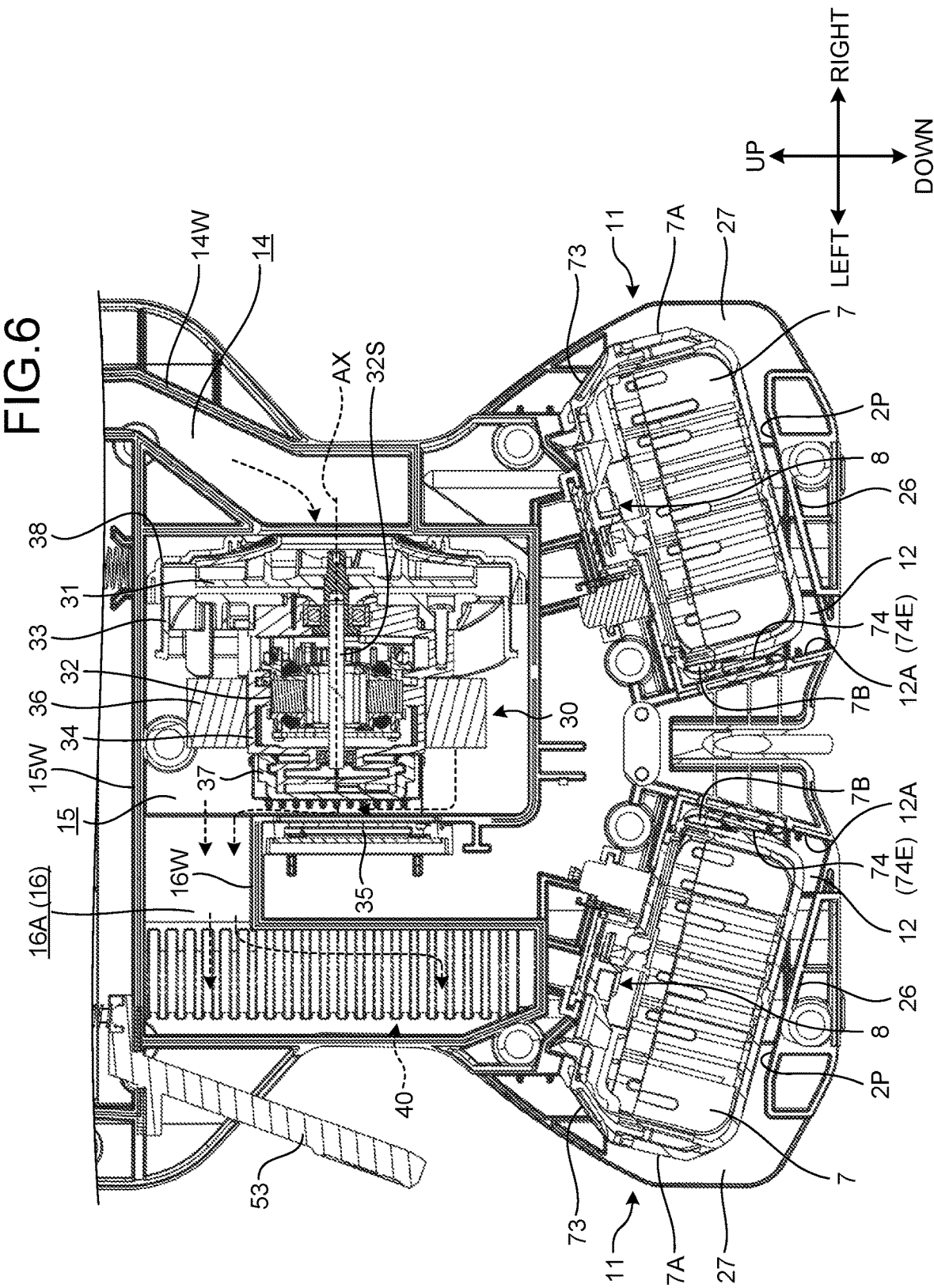
FIG. 6 is a sectional view of the vicinity of a drive unit according to the first embodiment.

FIG. 6 is a sectional view of the vicinity of the drive unit 30 according to the present embodiment. As illustrated in FIG. 6, the drive unit 30 includes the fan 31, the motor 32 configured to generate motive power for rotating the fan 31, a fan cover 33 accommodating the fan 31, a motor case 34 supporting the motor 32, a damper 36 disposed around the motor case 34, a motor support 37 supporting the motor case 34, and a support ring 38 disposed around the fan cover 33. The drive unit 30 is accommodated in the motor chamber 15.

The fan 31 is rotatable about a rotation axis AX. The fan 31 is disposed in the motor chamber 15 below the dust collecting chamber 13 such that the rotation axis AX is orthogonal to the up-and-down direction. The rotation axis AX of the fan 31 extends in a right-and-left direction. An output shaft 32S of the motor 32 is coupled to the fan 31. The rotation axis of the motor 32 corresponds to the rotation axis AX of the fan 31. By driving the motor 32, the fan 31 is rotated about the rotation axis AX.

The motor case 34 is disposed around the motor 32. The damper 36 absorbs noise generated by the motor 32. In other words, the damper 36 has a noise-absorbing function. Examples of the damper 36 include a sponge.

The motor support 37 and the support ring 38 each are an elastic member like rubber. The motor case 34 is fixed to the housing 2 with the motor support 37 and the support ring 38 interposed therebetween.

The backpack dust collector 1 includes a control board 35 disposed in the motor chamber 15. In the present embodiment, the control board 35 serves as a partition wall that defines the motor chamber 15. The control board 35 is disposed on the left side of the motor 32. The control board 35 is disposed downstream of the motor 32 such that a surface of the control board 35 is orthogonal to the rotation axis AX of the fan 31.

Figure 7:
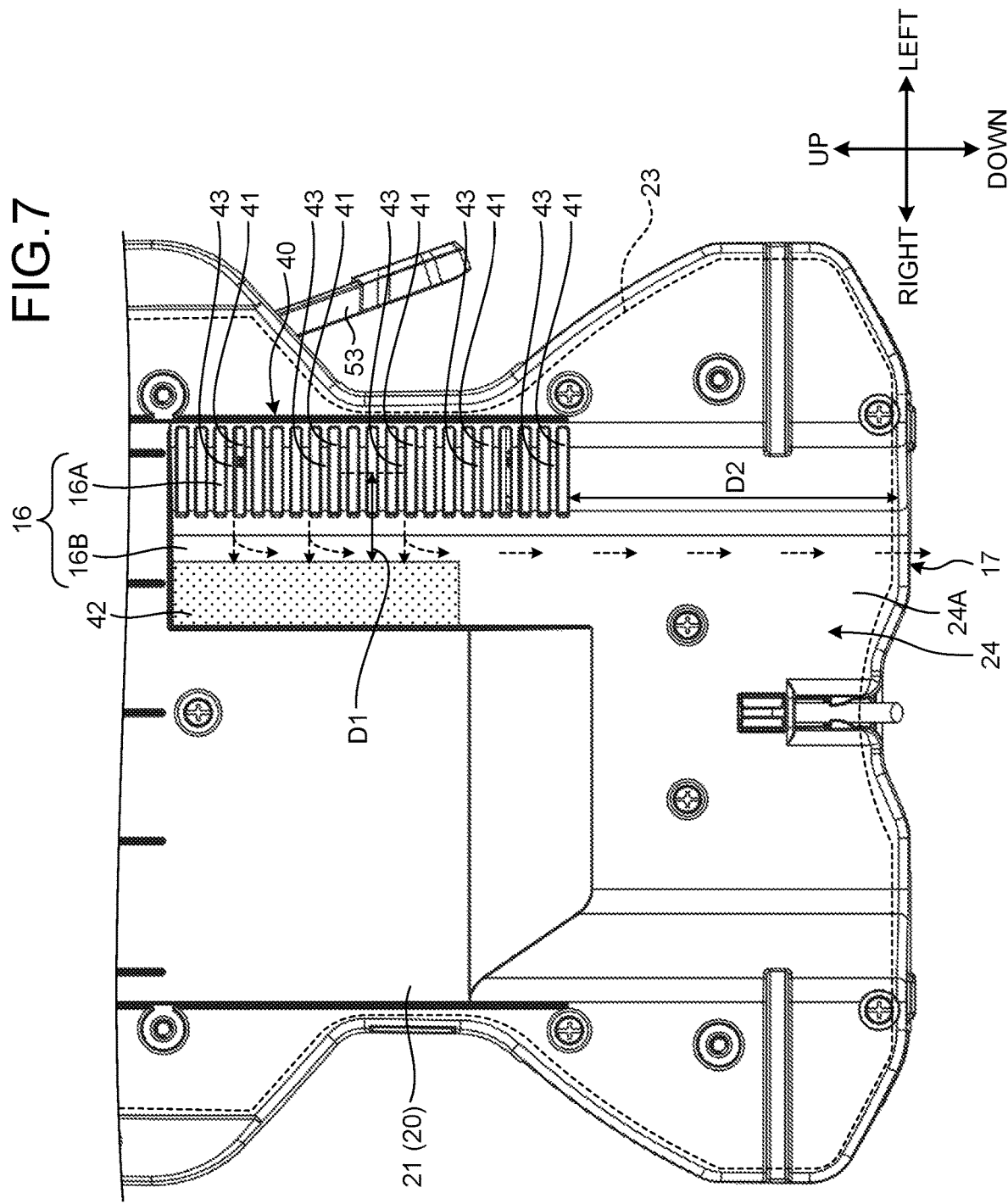
FIG. 7 is a diagram illustrating the vicinity of an exhaust port according to the first embodiment.
Figure 8:
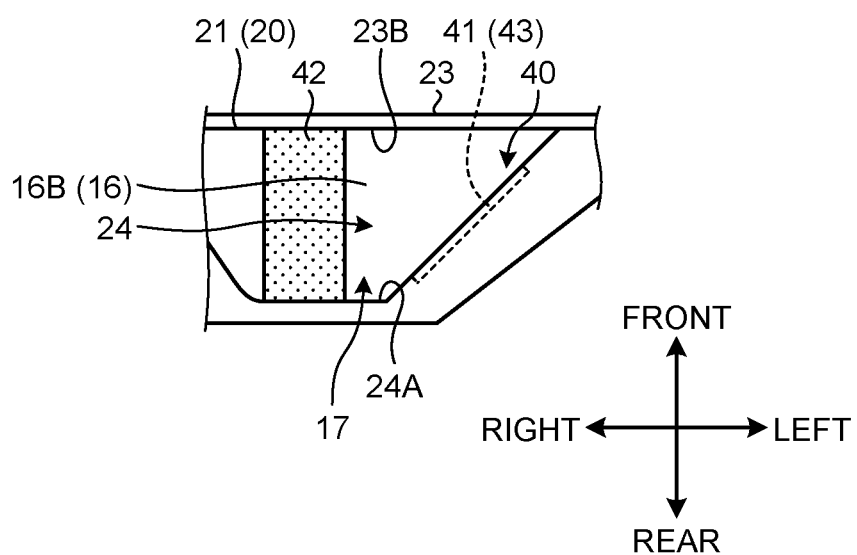
FIG. 8 is a diagram illustrating the exhaust port according to the first embodiment when viewed from below.

FIG. 7 is a diagram illustrating the vicinity of the exhaust port 17 according to the present embodiment. FIG. 8 is a diagram illustrating the exhaust port 17 according to the present embodiment when viewed from below. In FIG. 7, the plate 23 is indicated by an imaginary line.

The backpack dust collector 1 includes a slit portion 40 disposed in the flow path 16 between the motor chamber 15 and the exhaust port 17 and having slit-shaped vents 41 through which air from the motor chamber 15 passes.

The slit portion 40 is provided to at least part of the housing 2. In the present embodiment, the slit portion 40 is provided to the front housing 21. That is, the vents 41 are disposed in part of the front housing 21.

The vent 41 is narrow and long in the right-and-left direction. The longitudinal direction of the vent 41 corresponds to the right-and-left direction, and the crosswise direction of the vent 41 corresponds to the up-and-down direction. The vents 41 are arranged in the up-and-down direction. Between the vents 41 adjacent to each other, a rib 43 is provided.

The slit portion 40 is disposed in the flow path 16 between the motor chamber 15 and the exhaust port 17. The ribs 43 of the slit portion 40 divide the flow path 16 into a flow path 16A near the motor chamber 15 and a flow path 16B near the exhaust port 17. The flow path 16A between the motor chamber 15 and the slit portion 40 is defined in the internal space of the base housing 20. As illustrated in FIG. 3 and FIG. 6, the flow path 16A is defined by a partition wall 16W arranged in at least part of the perimeter of the flow path 16A. The flow path 16B between the slit portion 40 and the exhaust port 17 is defined between the recessed portion 24 of the front housing 21 and the plate 23.

The dimension of each vent 41 in the crosswise direction is small. The dimension of the vent 41 in the crosswise direction is so small that foreign matters in a space outside the housing 2 are prevented from entering the internal space (flow path 16A) of the housing 2.

The flow path 16B extends in the up-and-down direction. The flow path 16B is defined between an inner surface 24A of the recessed portion 24 of the front housing 21 and a rear surface 23B of the plate 23. The exhaust port 17 is defined in a lower end portion of the flow path 16B. In other words, the exhaust port 17 is defined by a lower end portion of the inner surface 24A of the recessed portion 24 and a lower end portion of the rear surface 23B of the plate 23.

In a state in which the housing 2 is carried on the operator WM□s back, the vents 41 face laterally. In the present embodiment, the vents 41 face rightward. In the state in which the housing 2 is carried on the operator WM□s back, the exhaust port 17 faces downward.

The backpack dust collector 1 includes a noise-absorbing member 42 disposed in at least part of the flow path 16B between the vents 41 and the exhaust port 17.

As illustrated in FIG. 7 and FIG. 8, the noise-absorbing member 42 is disposed so as to face the vents 41. The noise-absorbing member 42 faces each of the vents 41. At least part of the noise-absorbing member 42 is fixed to the inner surface 24A of the recessed portion 24. At least part of the noise-absorbing member 42 is fixed to the rear surface 23B of the plate 23.

The noise-absorbing member 42 includes a porous member. The noise-absorbing member 42 absorbs noise transmitted through air to suppress generation of noise. Examples of noise generated by the backpack dust collector 1 include wind noise generated when air passes through the vents 41 and NZ noise generated by rotation of the fan 31.

The noise-absorbing member 42 is an open-cell porous member. The noise-absorbing member 42 has numerous minute cells. The open cell means that the cells are connected to one another. As the open-cell porous member, at least one of soft urethane sponge, glass wool, rock wool, and felt is exemplified.

The open cell has a noise-absorbing function. Noise impinges on the cells at a surface of the noise-absorbing member 42. The noise impinging on the cells at the surface of the noise-absorbing member 42 propagates to adjacent cells. The noise strikes the inner surfaces of the cells. The cells are connected to one another. The noise propagates to other cells while reflecting off the inner surfaces of the cells. The energy of the noise is attenuated by striking the inner surfaces of the cells many times. Thus, the noise is reduced.

As illustrated in FIG. 7, the distance D1 between each vent 41 and the noise-absorbing member 42 is shorter than the distance D2 between the vent 41 and the exhaust port 17. The distance D2 is at least two times longer than the distance D1. The distance D1 is a distance between the center of the vent 41 in the longitudinal direction of the vent 41 and the noise-absorbing member 42.

The fan 31 rotates about the rotation axis AX, thereby generating suction force at the suction port 3. Air that has been suctioned with dust through the suction opening of the nozzle 6 by generating the suction force at the suction port 3 passes through the pipe 5 and the hose 4.

As indicated by arrows in FIG. 3, FIG. 6, and FIG. 7, the air that has passed through the pipe 5 and the hose 4 is introduced into the dust collecting chamber 13 through the suction port 3. To the suction port 3, the dust collecting bag 18 is connected. Dust contained in the air is caught and collected by the dust collecting bag 18. The air passes through the dust collecting bag 18. The air that has passed through the dust collecting bag 18 passes through the filter 19. The filter 19 catches and collects fine dust that cannot be caught by the dust collecting bag 18. The air that has passed through the filter 19 passes through the flow path 14, and then flows into the motor chamber 15. The air that has flowed into the motor chamber 15 passes through the fan 31 and the motor 32, comes into contact with the control board 35, and then flows into the flow path 16A. The air that has flowed through the flow path 16A passes through the vents 41 and flows into the flow path 16B. The air that has flowed through the flow path 16B is discharged through the exhaust port 17.

The slit-shaped vents 41 prevent foreign matters from entering the flow path 16A. Air flowing through the vents 41 may generate noise like wind noise. In the present embodiment, the noise-absorbing member 42 is disposed downstream of the vents 41. The noise-absorbing member 42 suppresses generation of such noise.

Figure 9:
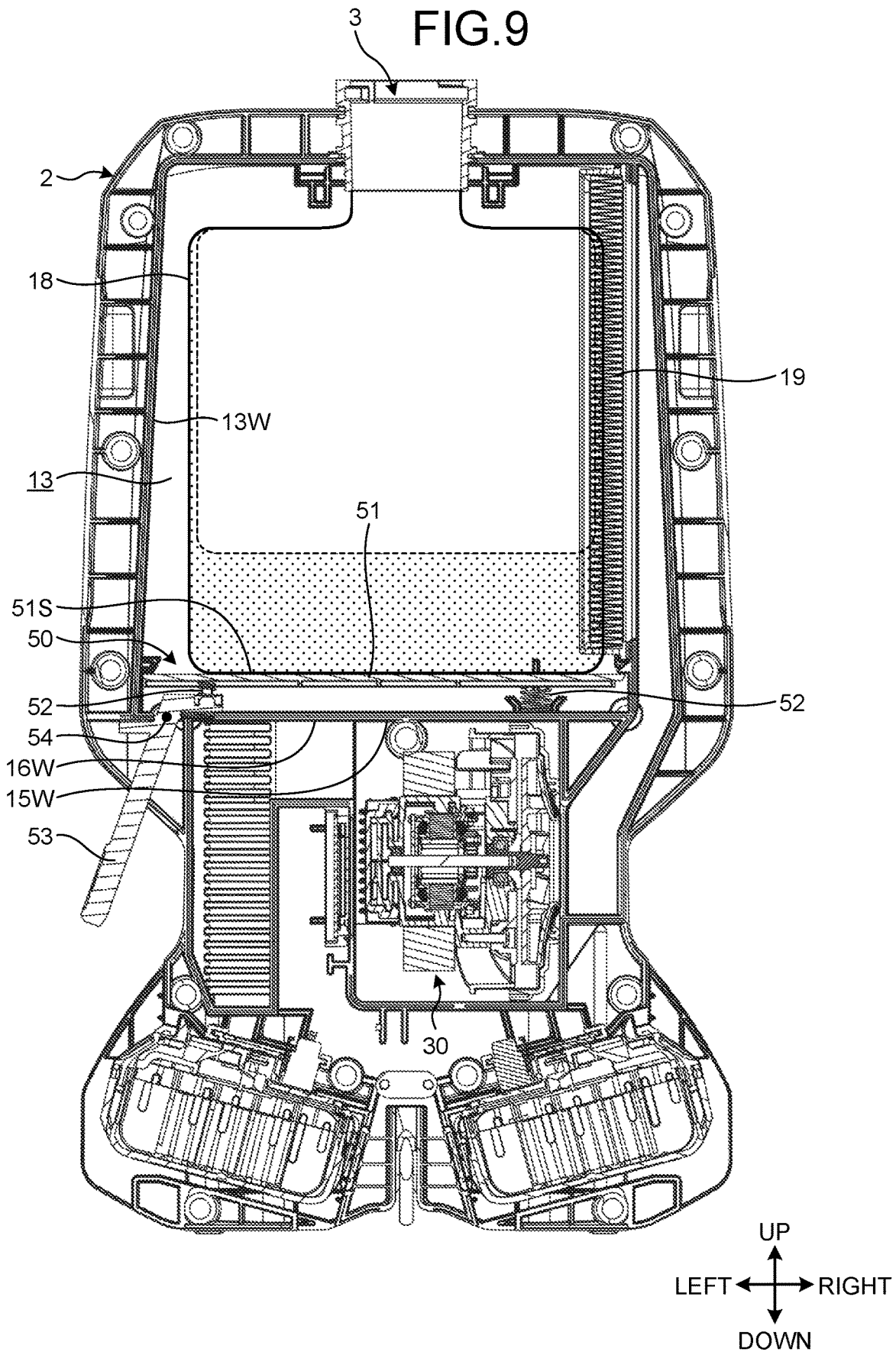
FIG. 9 is a sectional view of a dust collecting bag according to the first embodiment.

FIG. 9 is a sectional view of the dust collecting bag 18 according to the present embodiment. As illustrated in FIG. 9, when dust has been accumulated in the dust collecting bag 18, load due to the weight of the dust is applied to the bottom surface of the dust collecting chamber 13 from the dust collecting bag 18. In the present embodiment, the filter 19 is disposed on a side of the dust collecting chamber 13 so as to face the dust collecting chamber 13 in a state in which the housing 2 is carried on the operator WM's back. In the present embodiment, the filter 19 is disposed on the right side of the dust collecting chamber 13. This prevents the filter 19 from being clogged by the dust collecting bag 18 even when dust has been accumulated in the dust collecting bag 18. Because the filter 19 is prevented from being clogged, reduction of the suction force of the backpack dust collector 1 is suppressed.

The backpack dust collector 1 includes a vibration device 50 configured to vibrate the dust collecting bag 18. As illustrated in FIG. 9, at least part of dust may stick to an upper portion of the inner surface of the dust collecting bag 18. When dust has stuck up to the upper portion of the inner surface of the dust collecting bag 18, the flow rate of air passing through the dust collecting bag 18 decreases, whereby the suction force of the backpack dust collector 1 may be reduced. When the vibration device 50 vibrates the dust collecting bag 18, the dust sticking to the upper portion of the inner surface of the dust collecting bag 18 is shaken off, and piles up in a lower portion of the dust collecting bag 18. Thus, reduction of the suction force of the backpack dust collector 1 is suppressed.

In the present embodiment, the vibration device 50 includes a support member 51 supported by elastic members 52 and having a support surface 51S that can be brought into contact with the dust collecting bag 18.

The support member 51 is a plate-like member. As illustrated in FIG. 9, the support member 51 is disposed below the dust collecting bag 18 in the dust collecting chamber 13. The support surface 51S includes an upper surface of the support member 51 that can be brought into contact with a lower portion of the dust collecting bag 18.

The elastic members 52 are coil springs, for example. The elastic members 52 support a lower surface of the support member 51. In the present embodiment, the elastic members 52 are supported by the partition wall 15W and the partition wall 16W that are disposed below the support member 51. The support member 51 is supported by the partition wall 15W and the partition wall 16W with the elastic members 52 interposed therebetween. The elastic members 52 support the support member 51 in a swingable manner.

The backpack dust collector 1 includes an operating member 53 for moving the support member 51. The operating member 53 is operated by the operator WM. An upper end portion of the operating member 53 is arranged so as to face a lower surface of the support member 51. A lower end portion of the operating member 53 is arranged outside the housing 2. An intermediate portion of the operating member 53 is coupled to at least part of the housing 2 by a hinge 54.

Figure 10:
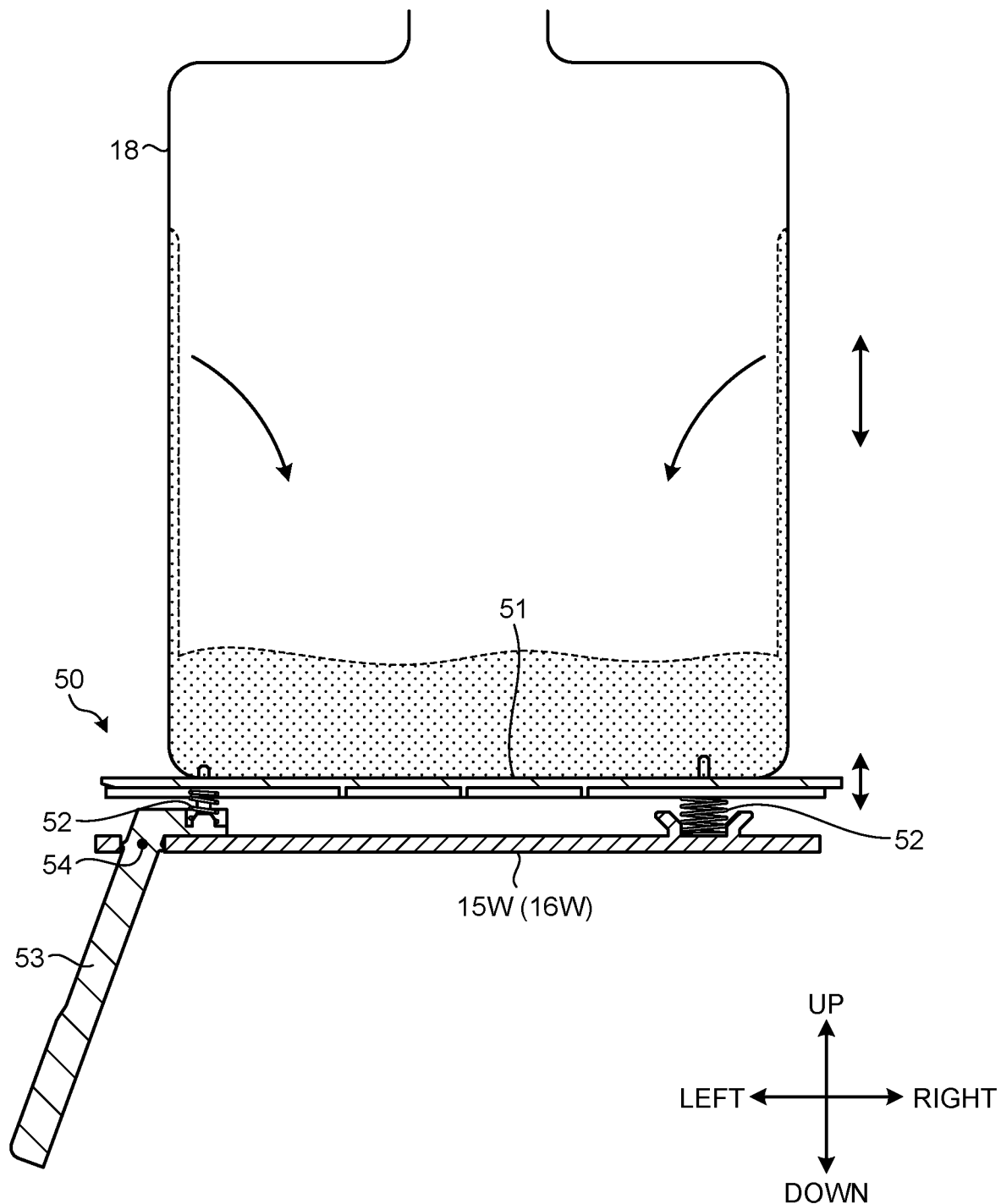
FIG. 10 is a diagram for describing motion of a vibration device according to the first embodiment.

FIG. 10 is a diagram for describing motion of the vibration device 50 according to the present embodiment. When the operator WM moves or walks while carrying the housing 2 on his/her back, the housing 2 moves accordingly. When the housing 2 moves, the support member 51 supported by the elastic members 52 vibrates with an amplitude greater than the amplitude of the housing 2. When the housing 2 moves, vibrations of the housing 2 are transmitted to the support member 51 in an amplified manner due to the effect of the elastic members 52. When the support member 51 vibrates greatly, the dust collecting bag 18 supported by the support member 51 accordingly vibrates greatly. When the dust collecting bag 18 vibrates greatly, dust sticking to an upper portion of the inner surface of the dust collecting bag 18 is shaken off, and piles up in a lower portion of the dust collecting bag 18 as illustrated in FIG. 10. Thus, reduction of the suction force of the backpack dust collector 1 is suppressed.

Figure 11:
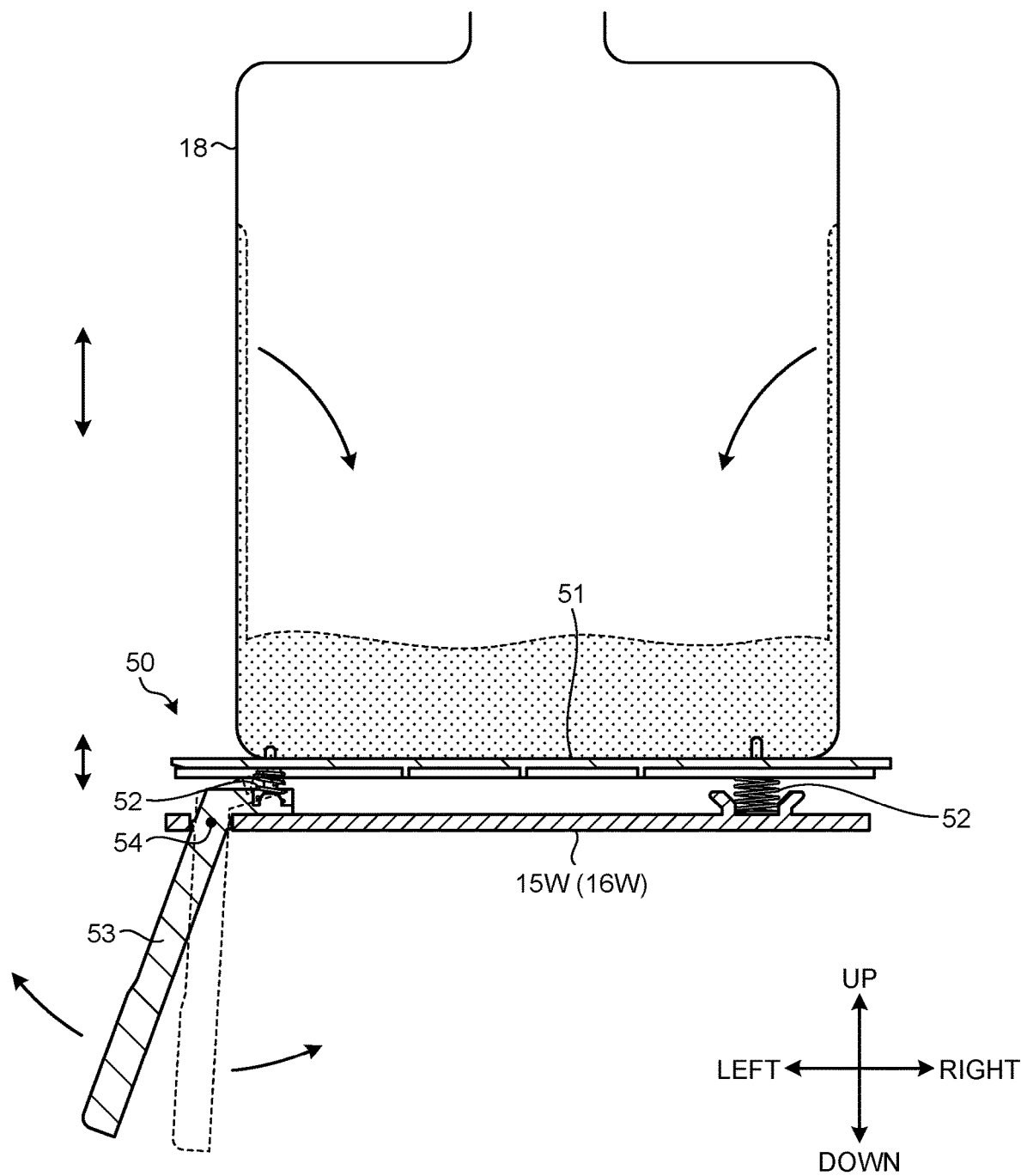
FIG. 11 is a diagram for describing motion of an operating member according to the first embodiment.

FIG. 11 is a diagram for describing motion of the operating member 53 according to the present embodiment. As illustrated in FIG. 11, the operator WM can operate the operating member 53 such that the operating member 53 rotates about the rotation axis of the hinge 54. When the operating member 53 is operated, the upper end portion of the operating member 53 moves up and down while being in contact with the support member 51. Thus, the support member 51 greatly vibrates up and down. When the support member 51 greatly moves up and down, the dust collecting bag 18 supported by the support member 51 accordingly moves greatly. When the dust collecting bag 18 vibrates greatly, dust sticking to an upper portion of the inner surface of the dust collecting bag 18 is shaken off, and piles up in a lower portion of the dust collecting bag 18 as illustrated in FIG. 11. Thus, reduction of the suction force of the backpack dust collector 1 is suppressed.

As illustrated in FIG. 2, FIG. 3, FIG. 5, and FIG. 6, the battery openings 11 are respectively formed on the left side surface 2E and the right side surface 2F of the housing 2. The battery openings 11 and the battery receiving portions 12 are formed at lower portions of the housing 2.

Each battery mounting portion 8 is arranged on an upper surface of the corresponding battery receiving portion 12. The battery mounting portion 8 has guide rails 81 configured to guide the corresponding battery 7 and a connection terminal 82 configured to be connected to a battery terminal 72 of the battery 7. The guide rails 81 extend in the right-and-left direction. The guide rails 81 in a pair are arranged in the front-and-rear direction. The guide rails 81 in a pair are arranged in parallel. The connection terminal 82 is arranged between the pair of guide rails 81.

The battery 7 is a general-purpose battery. The battery 7 may be a battery for a power tool. In the present embodiment, the battery 7 can be used as a direct-current power supply for a power tool. The battery 7 includes a plurality of lithium ion battery cells. The battery 7 can be charged by a battery charger. The battery 7 is portable. The battery 7 supplies power to at least the motor 32.

The battery 7 has a pair of slide rails 71 to be guided by the guide rails 81, the battery terminal 72 to be connected to the connection terminal 82 of the battery mounting portion 8, and a release button 73.

The slide rails 71 are guided by the guide rails 81 of the battery mounting portion 8. The slide rails 71 in a pair are arranged in parallel. The battery terminal 72 is arranged between the pair of slide rails 71. In a state in which the battery 7 is mounted on the battery mounting portion 8, the battery terminal 72 is connected to the connection terminal 82.

The release button 73 is operated to release the battery 7 fixed to the battery mounting portion 8. The release button 73 is provided on one end surface 7A of the battery 7. The battery 7 is mounted on the battery mounting portion 8 such that the release button 73 is directed outward in the right-and-left direction with respect to the center of the housing 2. In the state in which the battery 7 is mounted on the battery mounting portion 8, the release button 73 faces the battery opening 11.

In the present embodiment, the battery mounting portion 8 is inclined downward in the battery receiving portion 12 as farther from the battery opening 11. In other words, the battery mounting portion 8 is inclined downward toward an inner side of the battery receiving portion 12. The guide rails 81 are inclined downward in the battery receiving portion 12 as farther from the battery opening 11.

The front housing 21 and the rear housing 22 have respective bottom plates 26 that define bottom surfaces 2P of the battery receiving portions 12. Each of the bottom surfaces 2P faces part of the lower surface of the battery 7 mounted on the corresponding battery mounting portion 8. The bottom surfaces 2P are inclined downward in the battery receiving portion 12 as farther from the battery opening 11. The bottom plate 26 of the front housing 21 is fixed to at least part of the front housing 21 with a rib interposed therebetween. The bottom plate 26 of the rear housing 22 is fixed to at least part of the rear housing 22 with a rib interposed therebetween. In a lower portion of the battery receiving portion 12, an opening 12K is disposed. The opening 12K is disposed between the bottom plate 26 of the front housing 21 and the bottom plate 26 of the rear housing 22.

The front housing 21 and the rear housing 22 include inner side plates 27 that define inner side surfaces 2Q connected to the battery openings 11. Each of the inner side surfaces 2Q faces part of a side surface of the battery 7 passing through the battery opening 11. Each of the inner side surfaces 2Q of the front housing 21 is inclined rearward in the corresponding battery receiving portion 12 as farther from the corresponding battery opening 11. Each of the inner side surfaces 2Q of the rear housing 22 is inclined forward in the corresponding battery receiving portion 12 as farther from the corresponding battery opening 11. In other words, the width of a passage in the front-and-rear direction through which the battery 7 passes in the battery receiving portion 12 is smaller in the battery receiving portion 12 as farther from the battery opening 11.

Figure 12:
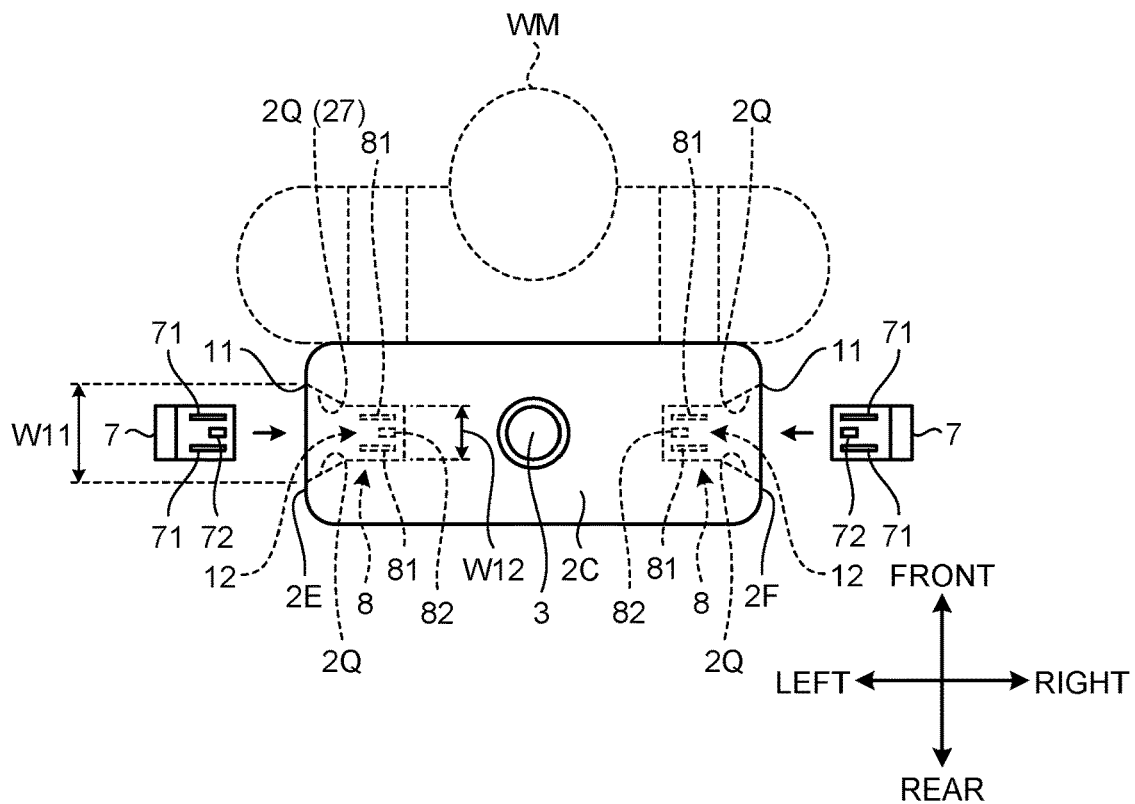
FIG. 12 is a top view schematically illustrating motion when batteries according to the first embodiment are mounted on battery mounting portions.

FIG. 12 is a top view schematically illustrating motion when the batteries 7 according to the present embodiment are mounted on the battery mounting portions 8. When mounting the batteries 7 on the battery mounting portions 8, the operator WM inserts the batteries 7 into the battery receiving portions 12 through the battery openings 11 respectively formed on the left side surface 2E and the right side surface 2F, thereby being able to mount the batteries 7 on the battery mounting portions 8.

When mounting a battery 7 on the left battery mounting portion 8, the operator WM inserts the battery 7 into the battery opening 11 formed on the left side surface 2E. The operator WM slides the battery 7 rightward while causing the guide rails 81 of the battery mounting portion 8 to guide the slide rails 71 of the battery 7. When the battery 7 has been slid rightward, the battery 7 is fixed to the battery mounting portion 8, and the battery terminal 72 of the battery 7 is connected to the connection terminal 82 of the battery mounting portion 8. Thus, the battery 7 is mounted on the battery mounting portion 8.

When mounting a battery 7 on the right battery mounting portion 8, the operator WM inserts the battery 7 into the battery opening 11 formed on the right side surface 2F, and then slides the battery leftward, thereby being able to mount the battery 7 on the battery mounting portion 8.

As illustrated in FIG. 2 and FIG. 12, in the present embodiment, the dimension W11 of each battery opening 11 in the front-and-rear direction is larger than the dimension W12 of the corresponding battery receiving portion 12 in the front-and-rear direction where the corresponding guide rails 81 are arranged. The dimension W11 corresponds to the distance between end portions of the pair of inner side surfaces 2Q that are closest to the battery opening 11. The dimension W12 corresponds to the distance between end portions of the pair of inner side surfaces 2Q that are closest to the guide rails 81. Because the dimension W11 of the battery opening 11 is large, the operator WM can insert the corresponding battery 7 smoothly into the battery opening 11. The operator WM can insert the battery 7 into the battery opening 11 while holding, for example, side surfaces of the battery 7. Because the dimension W12 of the battery receiving portion 12 is small, the battery 7 can be moved in the battery receiving portion 12 while being guided by inner side surfaces of the battery receiving portion 12 that each are located further in from the corresponding inner side plate 27 and also by the guide rails 81 in the battery receiving portion 12.

Furthermore, because the corresponding bottom plate 26 is provided, the battery 7 can be prevented from falling from the battery receiving portion 12 when the battery 7 is mounted on the battery mounting portion 8 or when the battery 7 is pulled out of the battery mounting portion 8.

As illustrated in FIG. 3 and FIG. 6, the backpack dust collector 1 includes moving mechanisms 74 each disposed in the corresponding battery receiving portion 12 and configured to generate force for moving the corresponding battery 7 toward the corresponding battery opening 11. Each moving mechanism 74 is disposed at a position where it can be in contact with the corresponding battery 7.

The moving mechanism 74 includes an elastic member 74E. Examples of the elastic member 74E include a leaf spring. The elastic member 74E may include a coil spring.

The elastic member 74E is disposed so as to face the other end surface 7B of the battery 7 in a state in which the battery 7 is mounted on the battery mounting portion 8. The elastic member 74E is disposed on the opposed surface 12A of the battery receiving portion 12. In the state in which the battery 7 is mounted on the battery mounting portion 8, the other end surface 7B of the battery 7 faces the opposed surface 12A. In the state in which the battery 7 is mounted on the battery mounting portion 8, the other end surface 7B of the battery 7 is in contact with the elastic member 74E.

Figure 13:
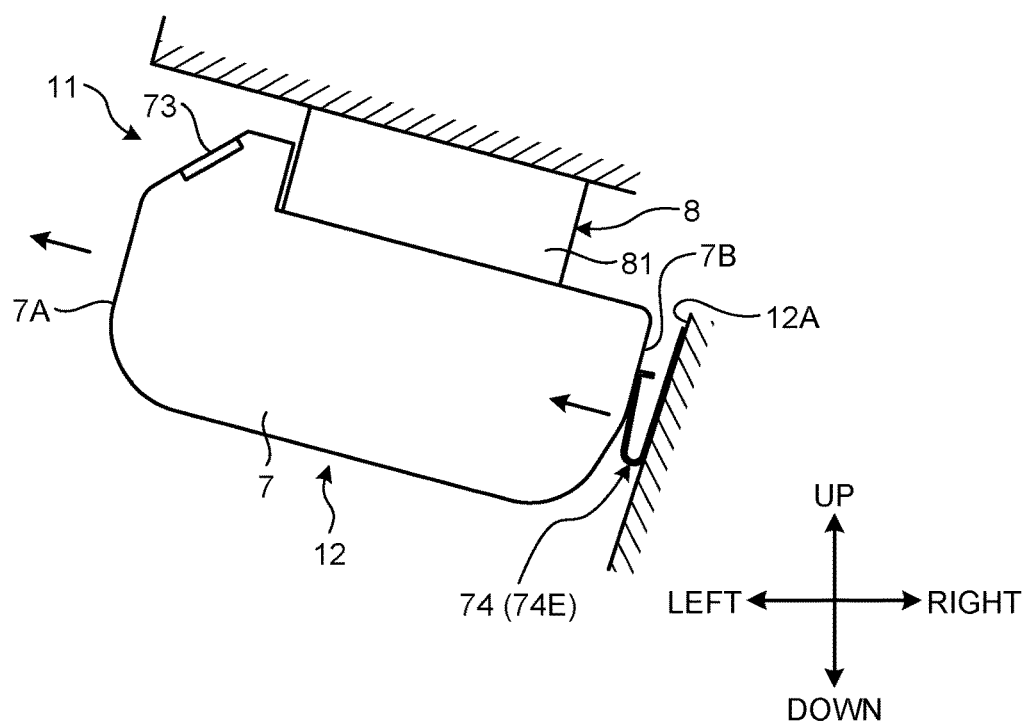
FIG. 13 is a diagram schematically illustrating a state in which a battery according to the first embodiment is mounted on a battery mounting portion.

FIG. 13 is a diagram schematically illustrating a state in which a battery 7 according to the present embodiment is mounted on a battery mounting portion 8. The guide rails 81 of the battery mounting portion 8 are inclined downward in the corresponding battery receiving portion 12 as farther from the corresponding battery opening 11. In the state in which the battery 7 is mounted on the battery mounting portion 8, the other end surface 7B of the battery 7 is in contact with the corresponding elastic member 74E. In the state in which the battery 7 is mounted on the battery mounting portion 8, the elastic member 74E is elastically deformed by the battery 7. The elastic member 74E thus elastically deformed generates elastic force for moving the battery 7 toward the battery opening 11.

When removing the battery 7 from the battery mounting portion 8, the operator WM operates the corresponding release button 73. When the release button 73 has been operated, the battery 7 fixed to the battery mounting portion 8 is released. When the battery 7 fixed to the battery mounting portion 8 has been released, the battery 7 is moved toward the battery opening 11 by the elastic force generated by the elastic member 74E. By the elastic force generated by the elastic member 74E, at least part of the battery 7 including the one end surface 7A is ejected outside the battery receiving portion 12 through the battery opening 11. This allows the operator WM to hold the battery 7 smoothly. While holding the battery 7 pulled out of the battery mounting portion 8, the operator WM can remove the battery from the battery receiving portion 12.

As described in the foregoing, according to the present embodiment, at least part of one battery opening (first battery opening) 11 is formed on the left side surface 2E of the housing 2, and at least part of another battery opening (second battery opening) is formed on the right side surface 2F of the housing 2. This enables the operator WM to smoothly perform operation of mounting a battery 7 to each battery mounting portion 8 and operation of removing the battery 7 from the battery mounting portion 8 by sliding the battery 7 in the right-and-left direction while carrying the backpack dust collector 1 on his/her back.

The battery openings 11 are arranged at a lower portion of the housing 2. This enables the operator WM to smoothly perform operation of mounting the battery 7 on the battery mounting portion 8 and operation of removing the battery 7 from the battery mounting portion 8 while carrying the backpack dust collector 1 on his/her back.

The corresponding moving mechanism 74 configured to generate force for moving the battery 7 toward the battery opening 11 is provided. Thus, by using the release button 73 to simply release the battery 7 fixed to the battery mounting portion 8, at least part of the battery 7 can be ejected outside the battery opening 11 with the force generated by the moving mechanism 74. Consequently, the operator WM can smoothly perform operation of removing the battery 7 from the corresponding battery receiving portion 12.

Second Embodiment

In the following description, components that are the same as or equivalent to those in the above-described embodiment are designated by the same signs, and description thereof is simplified or omitted.

Figure 14:
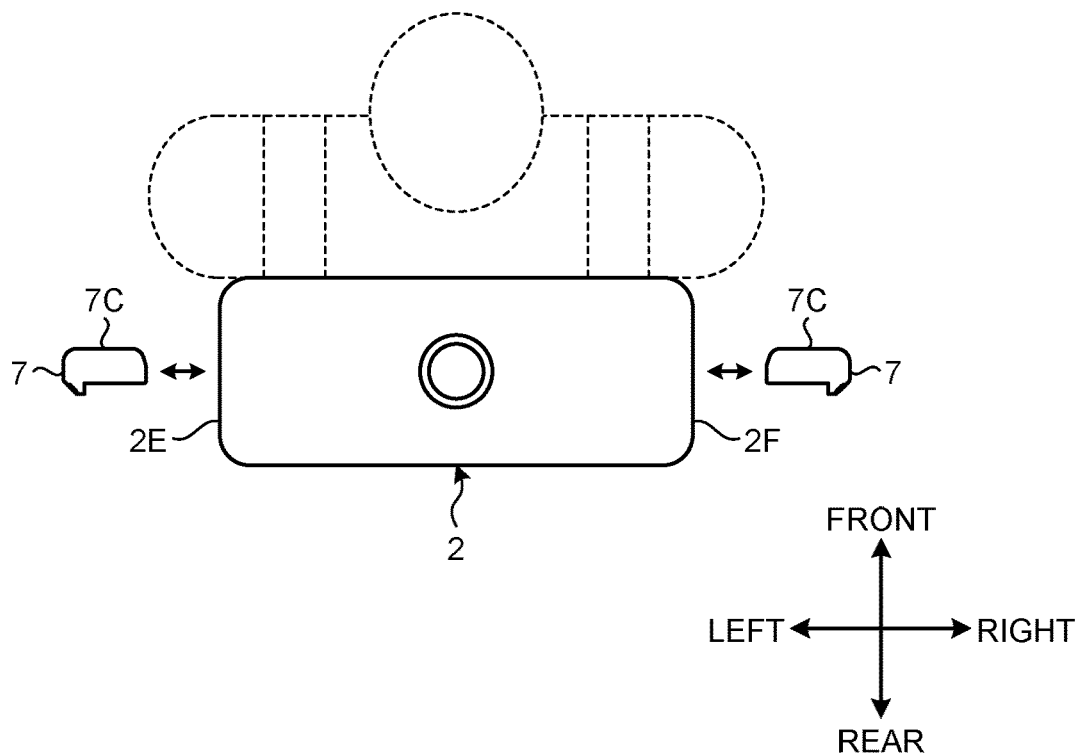
FIG. 14 is a top view schematically illustrating motion when batteries according to a second embodiment are mounted.

FIG. 14 is a top view schematically illustrating motion when batteries 7 according to the present embodiment are mounted. As illustrated in FIG. 14, the batteries 7 may be mounted on the battery mounting portions 8 such that the bottom surfaces 7C of the batteries 7 face forward.

Third Embodiment

Figure 15:
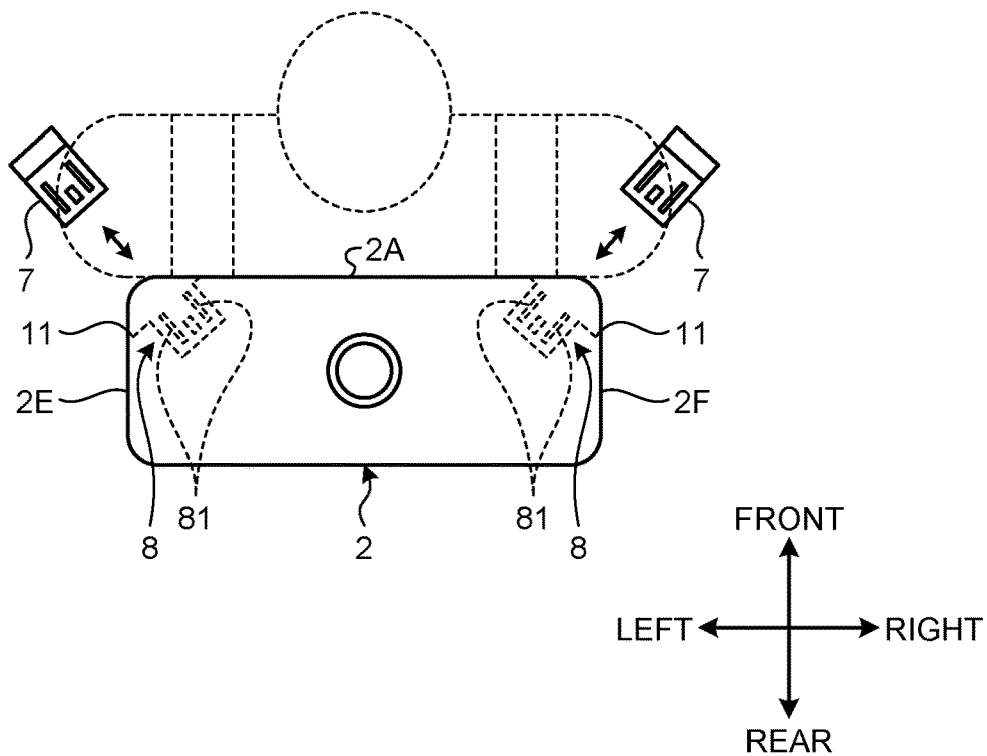
FIG. 15 is a top view schematically illustrating motion when batteries according to a third embodiment are mounted.
Figure 16:
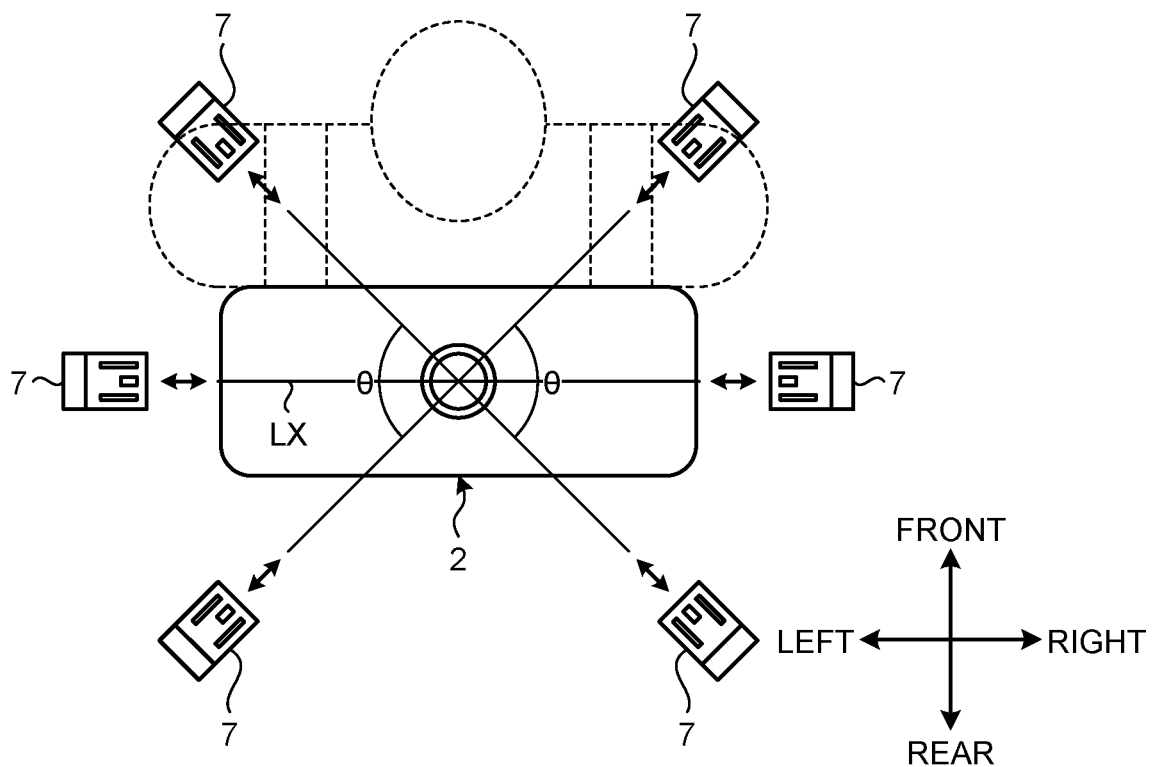
FIG. 16 is a top view schematically illustrating motion when the batteries according to the third embodiment are mounted.

FIG. 15 and FIG. 16 are top views each schematically illustrating motion when batteries 7 according to the present embodiment are mounted. As illustrated in FIG. 15, part of one of the battery openings 11 may be formed on the left side surface 2E, and part of this battery opening 11 may be formed on the front surface 2A. Furthermore, part of the other of the battery openings 11 may be formed on the right side surface 2F, and part of this battery opening 11 may be formed on the front surface 2A. The guide rails 81 of each battery mounting portion 8 are inclined rearward as farther from the corresponding battery opening 11. The operator WM can easily mount and remove the batteries 7 on the battery mounting portions 8 and from the battery mounting portions 8 while carrying the housing 2 on his/her back.

Herein, the guide rails 81 of each battery mounting portion 8 may be inclined forward or may be inclined rearward as farther from the corresponding battery opening 11 in the corresponding battery receiving portion 12. As illustrated in FIG. 16, the inclination angle θ of the guide rails 81 with respect to the lateral axis LX is preferably set to −45 degrees or greater and +45 degrees or smaller.

Fourth Embodiment

Figure 17:
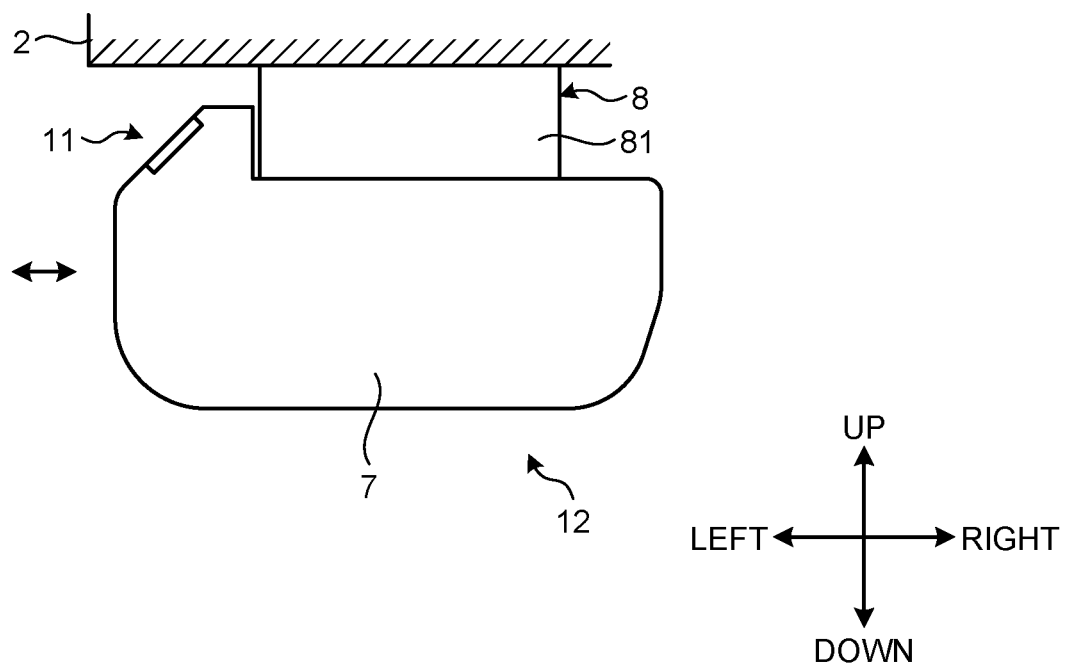
FIG. 17 is a diagram schematically illustrating a battery and a battery mounting portion according to a fourth embodiment.
Figure 18:
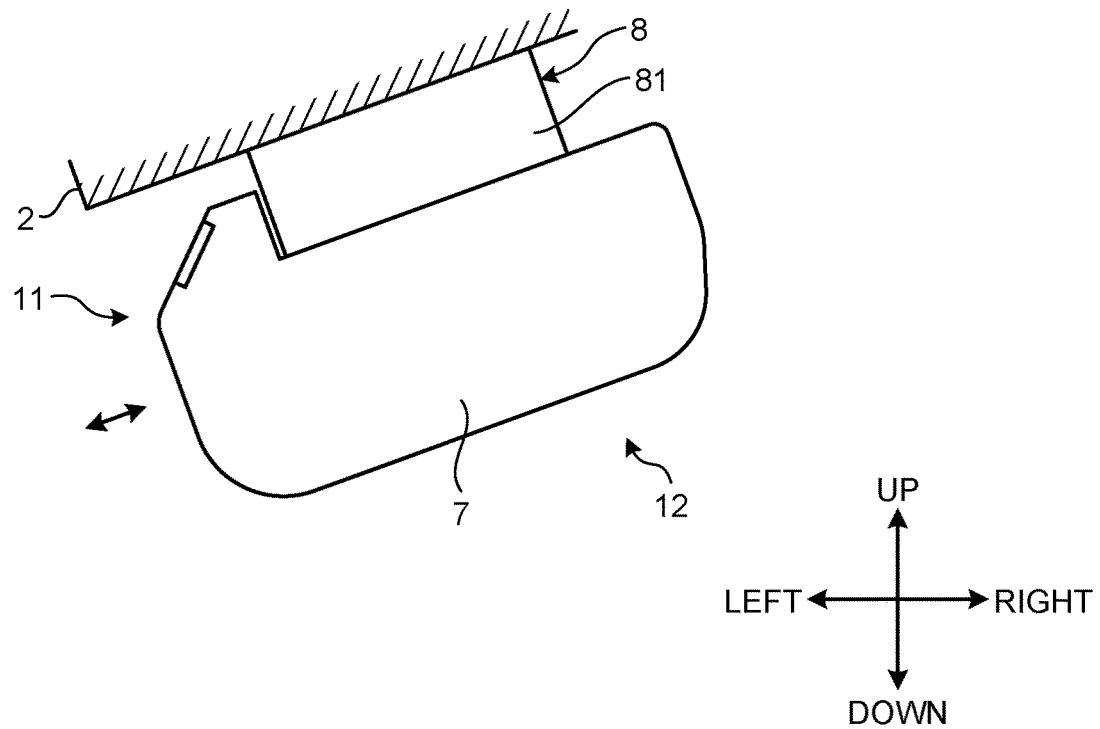
FIG. 18 is a diagram schematically illustrating the battery and the battery mounting portion according to the fourth embodiment.

FIG. 17 and FIG. 18 are diagrams each schematically illustrating a battery 7 and a battery mounting portion 8 according to the present embodiment. As illustrated in FIG. 17, the guide rails 81 of the battery mounting portion 8 may be parallel to a horizontal plane. The guide rails 81 may be parallel to the lower surface 2D of the housing 2, for example. Alternatively, as illustrated in FIG. 18, the guide rails 81 of the battery mounting portion 8 may be inclined upward as farther from the corresponding battery opening 11 in the corresponding battery receiving portion 12.

Fifth Embodiment

Figure 19:
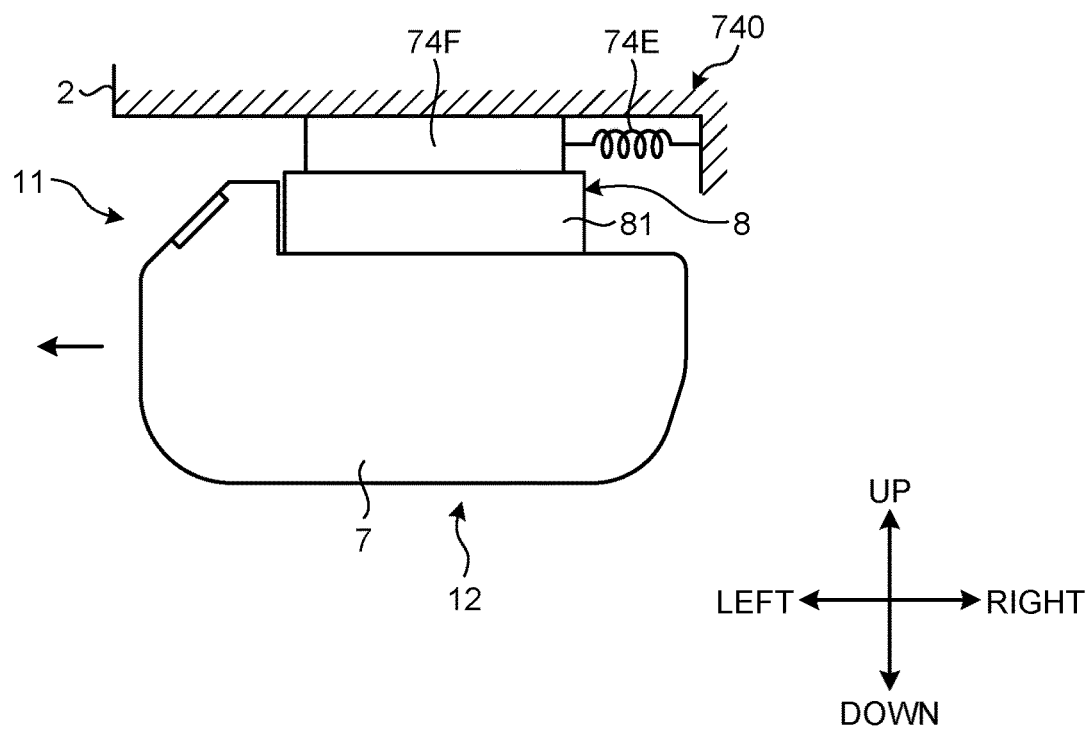
FIG. 19 is a diagram schematically illustrating a moving mechanism according to a fifth embodiment.

FIG. 19 is a diagram schematically illustrating a moving mechanism 740 according to the present embodiment. In the above-described embodiments, the elastic member 74E of each moving mechanism 74 is disposed so as to be in contact with the corresponding battery 7. As illustrated in FIG. 19, the moving mechanism 740 may include an elastic member 74E that is in contact with the corresponding battery mounting portion 8. The battery mounting portion 8 is supported by at least part of the housing 2 in a manner movable in the right-and-left direction. When the battery 7 is removed from the corresponding battery receiving portion 12, the battery mounting portion 8 is ejected with the battery 7 through the corresponding battery opening 11 with elastic force generated by the elastic member 74E.

Sixth Embodiment

Figure 20:
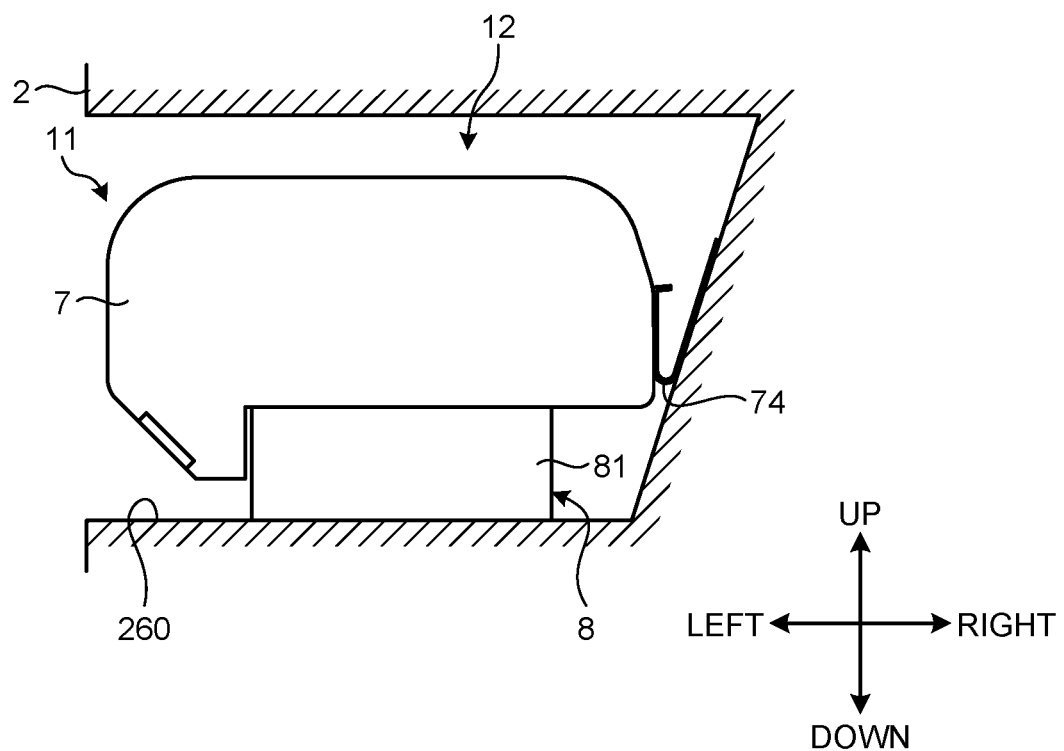
FIG. 20 is a diagram schematically illustrating a battery and a battery mounting portion according to a sixth embodiment.

FIG. 20 is a diagram schematically illustrating a battery 7 and a battery mounting portion 8 according to the present embodiment. In the above-described embodiments, each opening 12K is formed in a lower portion of the corresponding battery receiving portion 12. The lower portion of the battery receiving portion 12 may be closed. As illustrated in FIG. 20, a closing plate 260 that defines a bottom surface of the battery receiving portion 12 may be disposed in the housing 2. The battery mounting portion 8 may be arranged on the closing plate 260.

ANOTHER EMBODIMENT

In the above-described embodiments, the moving mechanism 74 includes the elastic member 74E. The moving mechanism 74 may include an actuator configured to generate drive force, such as an electric actuator or a hydraulic actuator.

According to an aspect of the present invention, the batteries can be mounted and removed smoothly.

What is claimed is:
1. A backpack dust collector comprising
a housing that includes:
    a suction port;
    a dust collecting chamber connected to the suction port and configured to accommodate a dust collecting bag;
    a motor chamber connected to the dust collecting chamber and accommodating a fan and a motor;
    an exhaust port configured such that air from the motor chamber is discharged through the exhaust port;
    first and second battery openings configured such that a battery can be inserted into and removed from the housing through each of the first and second battery openings, and
    a first battery receiving portion corresponding to the first battery opening and a second battery receiving portion corresponding to the second battery opening, each of the first and second battery receiving portions being configured to receive and retain the battery, wherein at least part of the first battery opening is formed on a left side surface of the housing, and at least part of the second battery opening is formed on a right side surface of the housing, the left side surface and the right side surface are opposite surfaces, the each of the first and second battery receiving portions includes a guide rail configured to guide the battery as the battery is inserted into the each of the first and second battery receiving portions, the guide rail extends in a right-and-left direction, and the guide rail is inclined downward from the first battery opening or the second battery opening.

2. The backpack dust collector according to claim 1, wherein the first battery opening is on the left side surface of the housing, and the second battery opening is on the right side surface of the housing.

3. The backpack dust collector according to claim 1, wherein the housing further comprising bottom plates that define bottom surfaces of the each of the first and second battery receiving portions, each of the bottom surfaces is configured to face a part of a lower surface of the battery when the battery is received and retained by the each of the first and second battery receiving portions, and the each of the bottom surfaces is inclined downward from the first battery opening or the second battery opening.

4. The backpack dust collector according to claim 1, wherein the first battery receiving portion includes a first battery mounting portion and the second battery receiving portion includes a second battery mounting portion, and each of the first and second battery mounting portion is on an upper surface of the first battery receiving portion or the second battery receiving portion.

5. The backpack dust collector according to claim 4, wherein the first battery opening and the second battery opening are at a lower portion of the housing.

6. The backpack dust collector according to claim 5, wherein the housing includes a front housing and a rear housing, each of the front housing and the rear housing includes a bottom plate that defines a bottom surface of the each of the first and second battery receiving portions, the bottom surface is configured to face a part of the lower surface of the battery when the battery is received and retained by the each of the first and second battery receiving portions, and an opening is in the housing between the bottom plate of the front housing and the bottom plate of the rear housing.

7. The backpack dust collector according to claim 2, wherein a dimension of the each of the first and second battery openings in a front-and-rear direction is larger than a dimension of the the each of the first and second battery receiving portions in the front-and-rear direction.

8. The backpack dust collector according to claim 7, wherein the housing includes a front housing and a rear housing, each of the front housing and the rear housing includes inner side plates that define inner side surfaces connected to the first and second battery openings, each of the inner side surfaces of the front housing is inclined rearward from the first battery opening or the second battery opening, and each of the inner side surfaces of the rear housing is inclined forward from the first battery opening or the second battery opening.

9. The backpack dust collector according to claim 8, wherein, in the each of the first and second the battery receiving portions, the battery is guided by the inner side surfaces and by and the guide rail.

10. The backpack dust collector according to claim 1, wherein part of the first battery opening and part of the second battery opening are in a front surface of the housing.

11. The backpack dust collector according to claim 10, wherein an inclination angle of the guide rail with respect to a lateral axis is equal to or smaller than 45 degrees.

12. The backpack dust collector according to claim 1, further comprising a moving mechanism in the each of the first and second battery receiving portions and configured to generate force for moving the battery toward the first battery opening or the second battery opening.

13. The backpack dust collector according to claim 12, wherein the moving mechanism is at a position where the moving mechanism is able to contact the battery.

14. The backpack dust collector according to claim 13, wherein the moving mechanism includes an elastic member.

15. The backpack dust collector according to claim 1, wherein the each of the first and second battery receiving portions is configured to receive a battery for a power tool.

16. A backpack dust collector comprising
a housing that includes:
a suction port;
a dust collecting chamber connected to the suction port and configured to accommodate a dust collecting bag;
a motor chamber connected to the dust collecting chamber and accommodating a fan and a motor;
an exhaust port configured such that air from the motor chamber is discharged through the exhaust port;
first and second battery openings configured such that a battery can be inserted into and removed from the housing through each of the first and second battery openings;
a first battery receiving portion corresponding to the first battery opening and a second battery receiving portion corresponding to the second battery opening, each of the first and second battery receiving portions being configured to receive and retain the battery; and
a first battery mounting portion in the first battery receiving portion and a second battery mounting portion in the second battery receiving portion, wherein at least part of the first battery opening is formed on a left side surface of the housing, and at least part of the second battery opening is formed on a right side surface of the housing, the left side surface and the right side surface are opposite surfaces, the first battery mounting portion is on an upper surface of the first battery receiving portion and the second battery mounting portion is on an upper surface of the second battery receiving portion, the first battery opening and the second battery opening are at a lower portion of the housing, the housing includes a front housing and a rear housing, each of the front housing and the rear housing includes a bottom plate that defines a bottom surface of the each of the first and second battery receiving portions, the bottom surface is configured to face a part of a lower surface of the battery mounted on each of the first and second battery mounting portions, and an opening in the housing is between the bottom plate of the front housing and the bottom plate of the rear housing.

17. The backpack dust collector according to claim 16, wherein the each of the first and second battery mounting portions includes a guide rail configured to guide the battery as the battery is inserted into the each of the first and second battery receiving portions, and the guide rail extends in a right-and-left direction.

18. The backpack dust collector according to claim 17, wherein the first battery opening is on the left side surface of the housing, and the second battery opening is on the right side surface of the housing.

19. The backpack dust collector according to claim 18, wherein the guide rail is inclined downward from the first battery opening or the second battery opening.

20. The backpack dust collector according to claim 19, wherein the housing further comprises bottom plates that define bottom surfaces of the each of the first and second battery receiving portions, each of the bottom surfaces is configured to face the part of the lower surface of the battery when the battery is received and retained by the each of the first and second battery receiving portions, and the each of the bottom surfaces is inclined downward from the first battery opening or the second battery opening.

* * * * *